Feb. 19, 1957   A. FISCHER   2,782,321
TURBINE FOR DRIVING A GENERATOR
Filed April 28, 1953   7 Sheets-Sheet 1
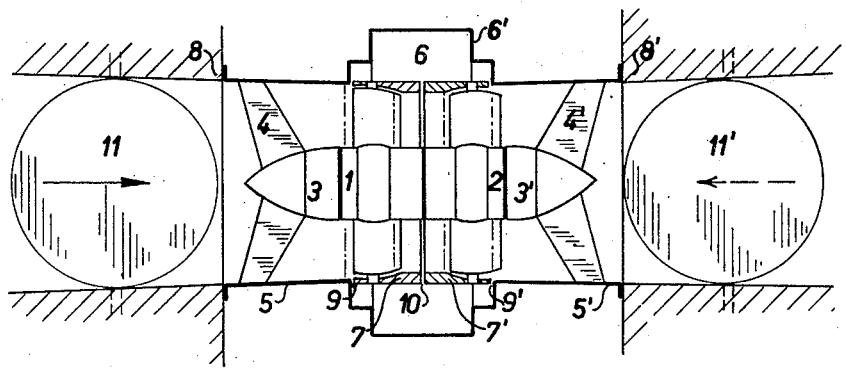
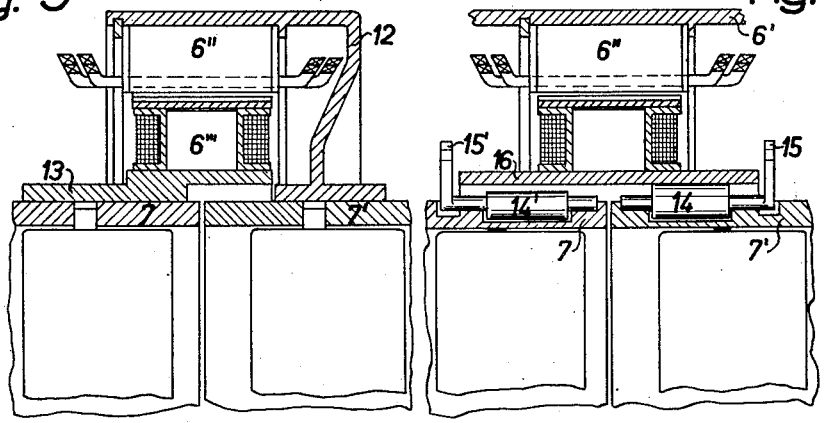
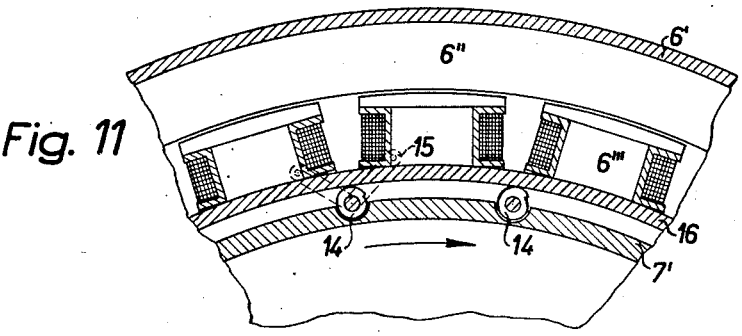
INVENTOR:
ARNO FISCHER
BY:

Feb. 19, 1957  A. FISCHER  2,782,321
TURBINE FOR DRIVING A GENERATOR
Filed April 28, 1953  7 Sheets-Sheet 2

INVENTOR:
ARNO FISCHER
BY:

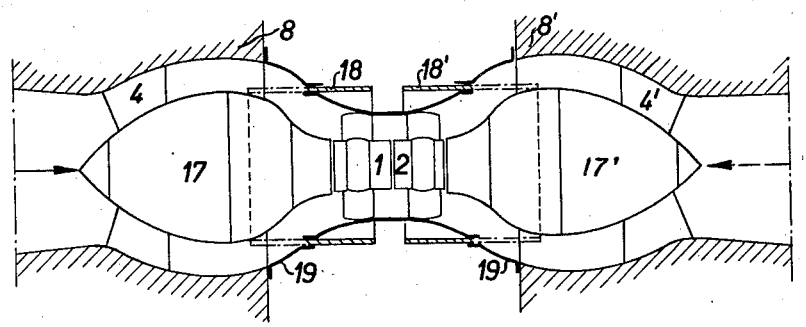
Fig. 12
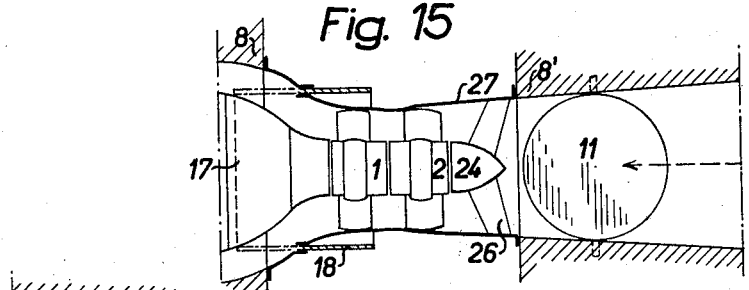
Fig. 15
Fig. 16
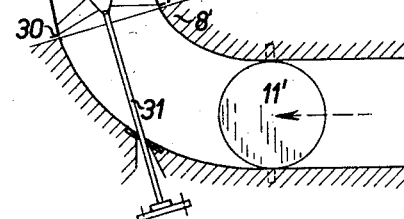
INVENTOR:
ARNO FISCHER
BY:

Feb. 19, 1957  A. FISCHER  2,782,321
TURBINE FOR DRIVING A GENERATOR
Filed April 28, 1953  7 Sheets-Sheet 4

INVENTOR:
ARNO FISCHER
BY:

Feb. 19, 1957 A. FISCHER 2,782,321
TURBINE FOR DRIVING A GENERATOR
Filed April 28, 1953 7 Sheets-Sheet 7

INVENTOR:
ARNO FISCHER
BY:

United States Patent Office 2,782,321
Patented Feb. 19, 1957

2,782,321

TURBINE FOR DRIVING A GENERATOR

Arno Fischer, Saarbrucken, Saar Territory

Application April 28, 1953, Serial No. 351,607

Claims priority, application Spain April 30, 1952

28 Claims. (Cl. 290—4)

It is the object of the invention so to develop a turbine that the approach flow is possible from both sides and can operate with the same efficiency in both approach flow directions.

In order to satisfy the conditions of two-way operation, that is to say, the approach flow of the turbine or of the pump in opposite directions, and of operating selectively as a turbine or a pump, power plants or pumping stations are known or have been proposed in which the pump or turbine aggregates employed are so provided with an inlet spiral and two supply pipes for the driving water or with two oppositely arranged machines that the flow to the machine aggregate can take place from different directions.

For alternate pump and turbine operations, such as required, for example, in pump storage power plants, a pump, the turbine and the generator are assembled to form a machine assembly. According to requirements, the electrical machine is used as motor or as generator and coupled with the pump or with the turbine. Both hydraulic machines have their own supply and discharge arrangements and also their own bearings and sealing members.

It is also known that it is possible for this purpose to use axial turbines or pumps, for example, the so-called underwater power plant turbines (also cylindrical turbines) and these are to be assembled as complete machine aggregates, encased in the part of the water supply pipe which carries the aggregate, so that it can be swivelled about an axis of rotation into the opposite inflow direction.

With the swivellable arrangement in a rotary device, the aggregate can be selectively used as a turbine or pump. It is thus turned into the corresponding approach flow direction and anchored in this position so that in the actual operating position, the guide vanes are disposed in front of or behind the rotor, in relation to the corresponding direction of flow of the driving medium. Therefore, both the operation as a turbine and as a pump can take place in opposite directions.

With the use of the underwater power plant turbine, it is further possible, for example, for the turbine, instead of being arranged in a rotational arrangement, to be provided with a guide wheel both in front of and behind the rotor.

In the first types of the aforementioned power plant installations, the expenditure in machines and on construction is very high on account of the duplicated arrangement of the duct pipes for the driving water or particularly due to the installation of machine aggregates operating alternately in opposite directions. Consequently, the economy of the complete installation is not assured in certain circumstances.

It is true that the economy of the installation is obtained by the use of axial turbines or axial pumps in a swivelling device. In certain cases, however, for example, with underwater power plants having low-power generating units or with power plants having a small head, it represents a constructional and operational impediment. Nevertheless, in these cases, the same efficiencies and working outputs could be guaranteed for both turbine and pump operation in either direction of flow.

The underwater power plant turbine with two guide arrangements and a rotor arranged in the centre can certainly be arranged fast in the power plant unit and does not have to be rotated as a unit with selective alternate approach flow and operational use. It has, however, the disadvantage of a smaller total efficiency, since one of the two guide arrangements constantly acts obstructively in one direction with alternative approach flow.

The subject of the present invention is that two rotors, which can be selectively used as guide wheels, are arranged on the turbine, so that the machine can have a two-way approach flow, thereby offering the same efficiency for like operating conditions.

For the purpose of obtaining two-way approach flow for the hydraulic machine, the rotor blades thereof have to be adjusted. The adjustment of the rotor blades or guide wheel vanes is so proposed in accordance with the present invention, or independently in hitherto known hydraulic machines, that it is effected by a worm wheel on the extended journal of the rotor blades or guide wheel vanes of a turbine with external rims and a worm adapted to be used as a rack. By this arrangement, there is provided the further possibility of adjusting the blades of the turbine from the outer rim, which is to be desired on constructional grounds with multi-blade machines having a small boss or hub diameter.

Obviously, this does not exclude the possibility that with suitably dimensioned boss, the adjustment can also be effected by means of a worm wheel arranged on the blade roots and a worm adapted to be used as a rack and cooperating with said worm wheel.

In the arrangements previously mentioned, rotating driving motors, mainly electric motors, are necessary for the drive of the worms. These motors had to be arranged on the rotating part of the rotors and had to rotate with the latter.

Consequently, it is possible to provide a particular advantage if the arrangement is such that the adjustment of the blades is effected by the adjusting motor (servo-motor) usually provided for the regulation, and mainly step-by-step. In this case, there are provided two possibilities for carrying out the adjusting operation. Either both the forward and the rearward travel of the piston of the adjusting motor is used for moving the blades in one direction, or the blades are coupled with said motor only during the inward or outward travel, according to direction or adjustment. In the latter case, it is advantageous to couple the blades with the rotor boss between the separate steps of the adjustment operation, i. e. during the idle travel of the piston of the adjusting motor, so that an unintentional adjustment of the blades is avoided. This requirement no longer exists in the case in which both the inward and outward travel of the piston of the adjusting motor effect the further setting of the blades, if the arrangement is such that during the recoupling of the connection between the blades and the piston of the adjusting motor, which becomes necessary in this case, the connection being disengaged is kept fast or loose until the connection being made has come into engagement. This requirement is met in a particularly advantageous manner by an arrangement in which the blades are equipped with toothed rims, pinion rims or the like and cooperate with toothed bars, racks or the like moved with the adjusting motor between the blades in such manner that the racks or the like, during the forward travel of the piston of the adjusting motor, are in engagement with the toothed rim of one adjacent blade, and are in engagement with the toothed rim of the other adjacent blade during the return travel. The same objects is achieved by the toothed rim segments, coupling elements or the like which are moved by the adjusting motor piston and which cooperate with racks, toothed bars, coupling rims or the like arranged on the blades in such manner that the said racks or the like are coupled on one side of a plane passing through the axis of rotation of the blades with the forward travel of the piston of the adjusting motor, and are coupled on the opposite side with the rack segments, toothed bar segments, coupling elements or the like with the return travel.

As compared with the known turbines, in which an adjustment of the blades for the purpose of varying the method of operation or the functioning of the turbine does not take place, additional space is required in the boss for the arrangement required for the adjustment if the latter is effected from the boss. For this reason, it is expedient to make the roots of the rotor blades as short as possible, and consequently advantageously of disc formation. The driving means connected between the adjusting motor and the blades will be arranged inside the disc-shaped blade roots for the purpose of saving further space.

The adjustability of the blades and the increased path of adjustment provided by the disc-shaped formation of the blade roots make it particularly important to make the sealing between the movable blades and the boss member reliable in operation. It is therefore desirable to make the blade roots in such manner that a single-part sealing and a single-part pressure ring can be employed for the same. Since normally the disc of the blade root will have a larger diameter than the neck thereof, which cooperates with the packing, it is particularly expedient for the turbine constructed in accordance with the invention to form the disc-shaped blade root from a cylindrical core, the diameter of which is not larger than the packing, and a cylindrical ring pushed over this core, and to fix the core and ring relatively to one another.

When operating as a turbine, it is the wheel next adjacent to the inlet which is fixed, and when operating as a pump, it is the wheel next adjacent to the outlet which is fixed, the fixed wheel assuming the function of a guide wheel, whereas the other wheel is used as a rotor.

In this case, a change-over is to be carried out between the rotors and the electrical or mechanical machine cooperating therewith, or the rotors are to be alternatively coupled with the fixed boss or housing part. Slipping clutches or slipping brakes are expediently provided for this purpose, it being possible by means of such clutches or brakes for the transition of the speed of rotation of the wheels to the part actually to be coupled to the latter to take place gently. These slipping clutches or slipping brakes will advantageously be hydraulically operated.

It is obviously only in accordance with the double function of the turbo-machine as a turbine or pump, as effected in accordance with the invention, that also the customary regulating devices are adapted to this double function. The adjustment of the blades when operating as a turbine for the purpose of varying the speed will obviously be effected in known manner by a speed governor, whereas the adjustment of the blades when operating as a pump will, on the contrary, mainly be effected by a control apparatus covering differences in level of the driving medium in front of and after the pump and taking into account the power consumption of the motor driving the pump, the speed governor being mainly inoperative during pump operation.

The invention in this way is to satisfy all conditions of the two-way approach flow and of the selective operation as a pump or turbine, by the fact that it obviates all disadvantages of the hitherto known constructions for one or other types of operations and it renders it possible for all properties of the different types of operation to be combined in a closed or self-contained machine.

The possibility of use and the readiness for operation of machine sets comprising turbines, pumps and electrical or mechanical machines are obtained by the actual combination of the turbine or the pump with the electrical or mechanical machine driven by or driving the latter.

Special requirements are produced in this respect when the machine set is to be used in defense power plants or high-pressure conduits. In these cases, the strictest combination of the structural parts of the machine set is required.

The invention complies with this requirement to a great extent, for the pump, the turbine and the electrical or mechanical machine may be combined in a self-contained unit in accordance with the invention. The bearings of the turbine may at the same time be bearings of the pump and the electrical or mechanical machine.

The provision of two rotors and their selective use as rotors or impellers renders it possible to conform to the requirements of an economic two-way approach flow at minimum cost of construction and while avoiding special losses of time in operation or unfavourable hydraulic effects; that is to say, the particular advantages of the axial-flow turbine with two rotors (hereinafter referred to as the "axial-flow double-wheel turbine") are based on their simple and compact construction and the relatively low manufacturing costs combined therewith, and also above all on their capacity for being used economically in power plants with a small head as pump accumulator aggregates or tidal power aggregates.

Especially for these cases, but also in other cases, it may be of particular advantage that the blades can also be adjusted in such manner that the turbine can also be operated as a passage, no-load course or the like for the driving medium.

The invention provides for the arrangement of the two rotors on all known axial-flow turbines.

The principle of the invention is more fully explained with reference to the drawing and the use thereof is described with reference to a number of constructional examples.

In the drawing:

Figure 1 is an axial-flow double-wheel turbine with a generator traversed by water.

Figure 9 shows the combination of the electrical machine with the two rotors of an axial-flow double-wheel turbine having a generator traversed by water.

Figure 17:
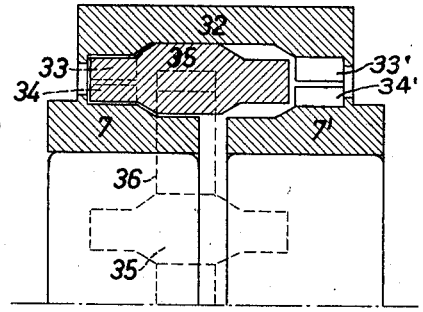
Figure 18:
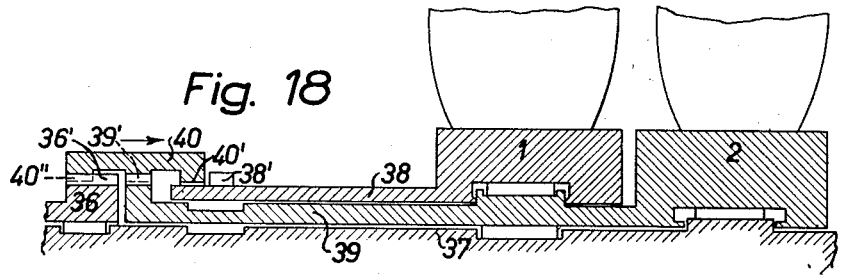
Figure 13:
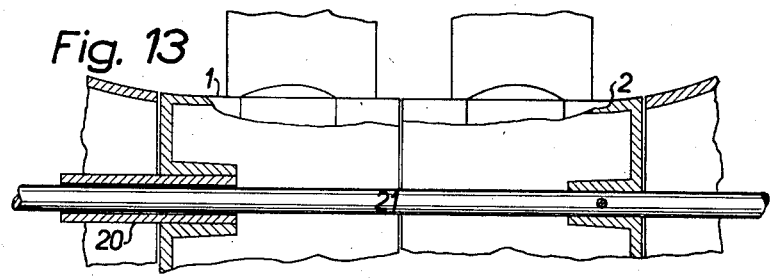
Figure 14:
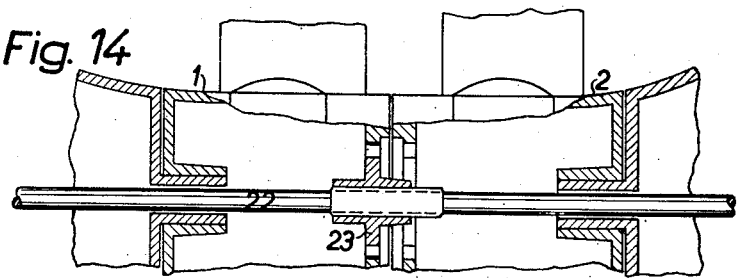
Figure 19:
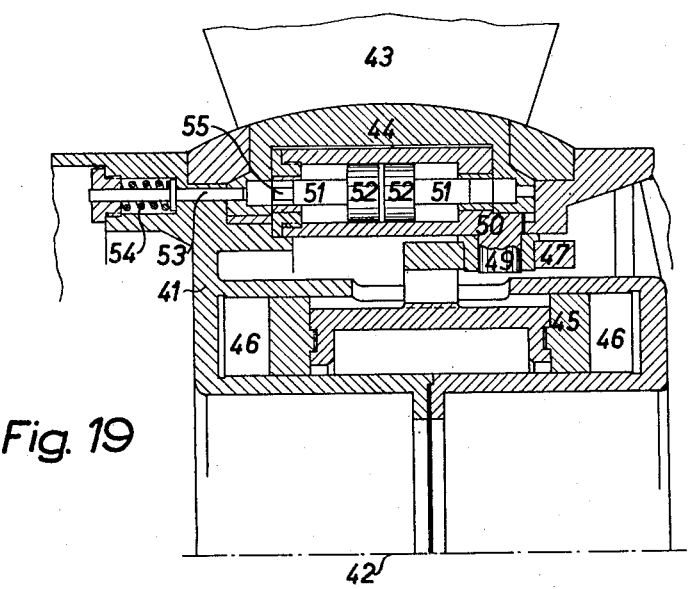
Figure 20:
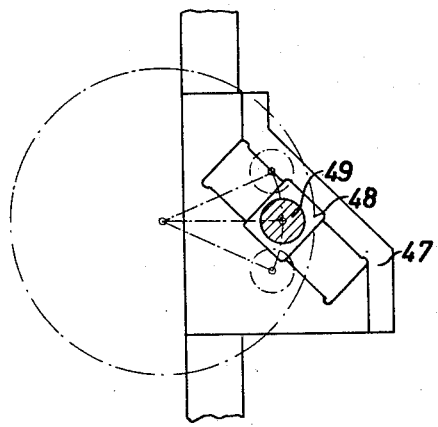
Figure 21:
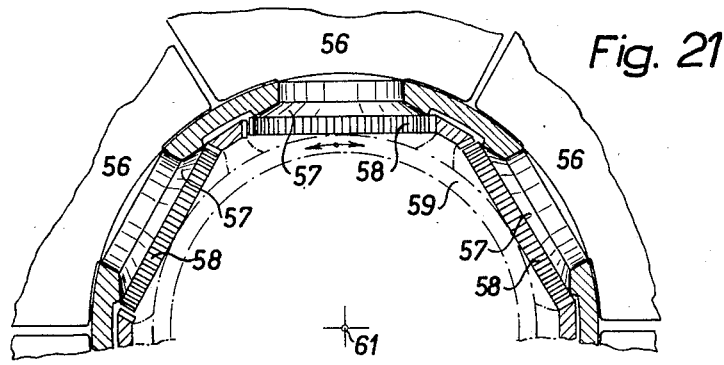
Figure 22:
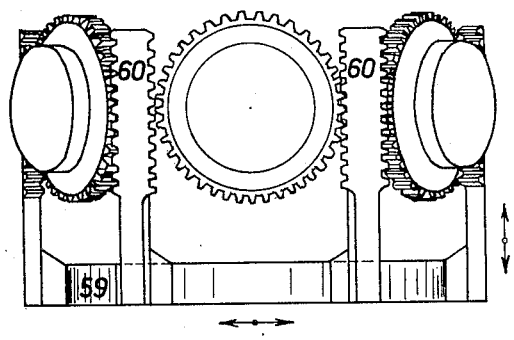
Figure 23:
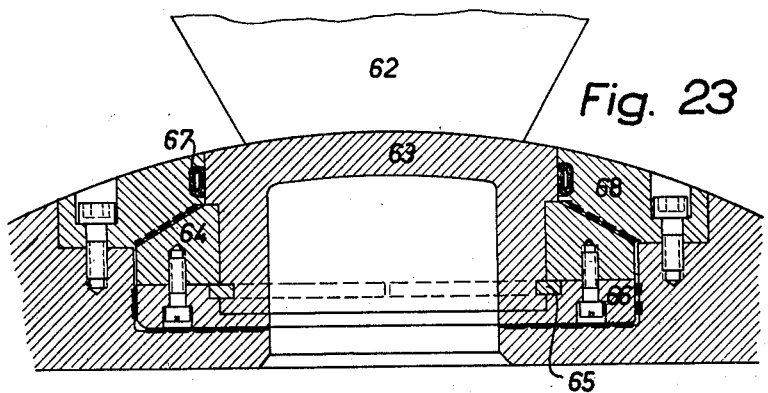
Figure 24:
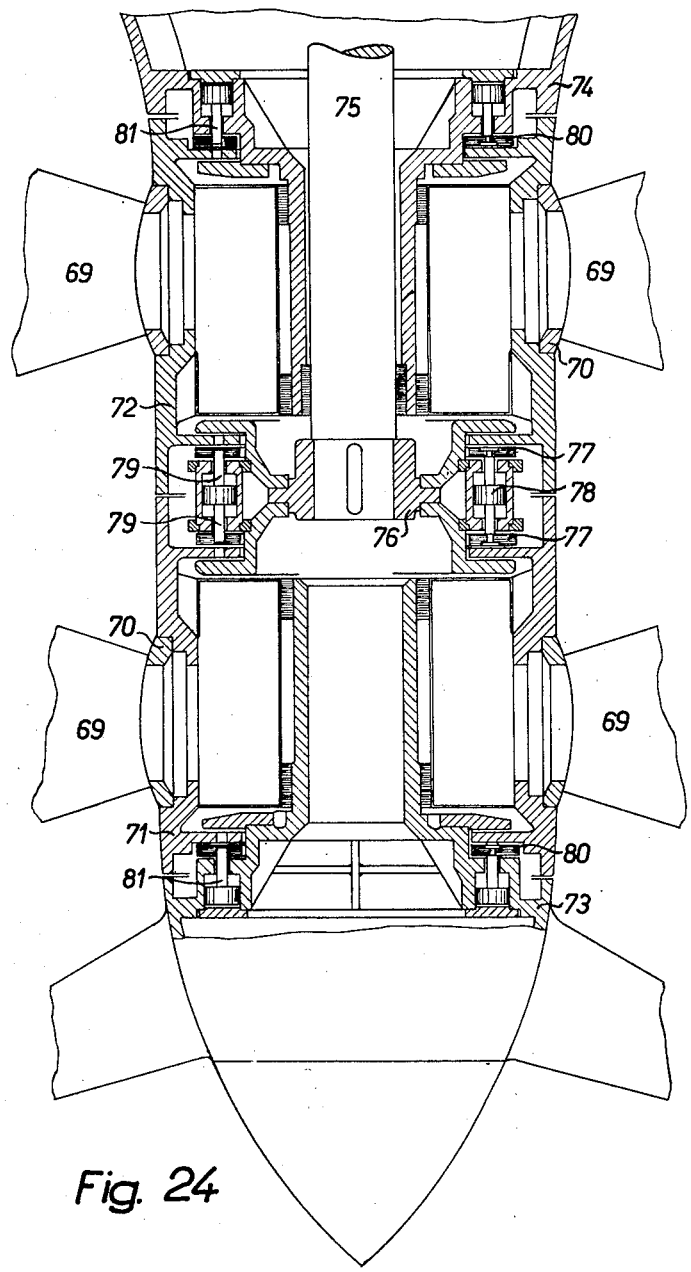

Figures 10 and 11 show the alternative coupling of the rotor of the electrical machine of an axial-flow double-wheel turbine having a generator traversed by water, with one of the two rotors of the turbine, Figure 12 is an axial-flow double-wheel turbine having a generator around which water flows and a turbine hub enlarged on both sides, Figure 13 is an axial-flow double-wheel turbine having a generator around which water flows and a turbine hub enlarged on one side, Figure 14 shows the connection of the electrical machine with the two rotors of an axial-flow double-wheel turbine having a generator around which water flows, Figure 15 shows the coupling of the rotor of the electrical machine of an axial-flow double-wheel turbine around which water flows, the coupling being alternatively with one of the two turbine rotors, Figure 16 shows an axial-flow double-wheel turbine with electrical or mechanical machines disposed externally of the duct for the driving medium, Figures 17 and 18 are examples of the coupling in a turbine arrangement according to Figure 12 or Figure 15, Figures 19 and 20 are examples of the step-by-step adjustment of the blades by the servo-motor with one step per movement of the piston, Figures 21 and 22 are examples of the step-by-step adjustment of the blades by the servo-motor of the turbine with two steps per movement of the piston, Figure 23 is an example of the disc-shaped construction of the blade roots, Figure 24 is an example of the arrangement of slipping clutches or slipping brakes in a double-wheel turbine.

The constructional example according to Figure 1 consists of a machine set or assembly capable of being used as a pump or turbine and having an axial approach flow, said assembly having two rotors 1 and 2, both mounted in the turbine hub 3, 3', which is held by means of supporting blades 4, 4' centrally in the tubular section 5, 5' of the water duct, and an electrical machine 6 which is constructed as an external rotor and which concentrically surrounds the rotors 1 and 2, said machine 6 being covered by a housing 6'. Adjoining the outer rims 7, 7' of the turbine rotors 1 and 2 on both sides are the tubular sections 5, 5' of the water duct, said section being anchored in the brickwork 8, 8'. Provided at the gaps 9, 9' in known manner between the outer rims and the said tubular sections are gap-reducing devices with the associated collecting channels for carrying away the water passing through at these points. Similarly, a packing is provided in the gap 10 between the two outer rims 7, 7', which in one case can permanently rotate with a rotor by being connected fast therewith. However, it can also be fitted as a double-sided central packing element and be fixed to the housing of the electrical machine 6, of which packings, with alternative operation of the turbine, one is always operative as a stationary packing and the other as a sliding or operating packing. The construction of the packing can be of any desired construction, independently of the feature of the invention.

As sealing members in this constructional example, there are provided throttle valves 11, 11', which are mounted to be rotatable in the brickwork 8, 8' of the water duct.

The two rotors 1 and 2 are so arranged that, according to the invention, one of them at any time assumes the activity of a guide wheel in a certain position which can be fixed.

For this purpose, the blades of the two rotors 1 and 2, which blades conform to one another in shape and dimensions, are mounted to turn about pins in the rims, so that their angular position can be varied and fixed.

Figure 8:
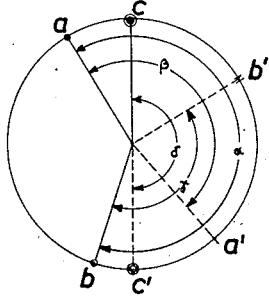

The different angular positions of the blades are illustrated in Figure 8, α being the total angle of adjustment.

The adjustment of the blades when changing over the two rotors is effected through the angle β, a representing the position of the blades as a guide wheel and a' the position as rotor.

As a pump with two-way pumping direction, the blades are adjusted from the angular position b to b' through the angle γ.

For operating the turbine as a passage or no-load path, with two-way direction of flow, the blades are brought into the positions c and c'.

The operation of the adjustment of the angular positions is illustrated in Figures 2 to 7. In the position according to Figure 2, the rotor 2 acts as a guide wheel, whereas according to Figure 3, with opposite approach flow of the operating water, the rotor 1 serves as a rotor. The approach flow of the operating water is indicated by the arrows P and the direction of rotation by the arrow R.

Figure 2:
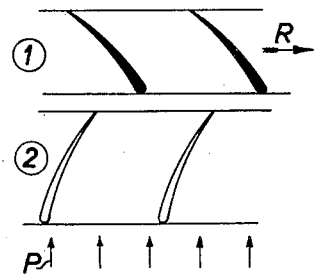
Figures 2 to 8 show diagrammatically the two-way function as guide wheel and rotor in turbine and pump operation, and also as an outlet or passage.
Figure 3:
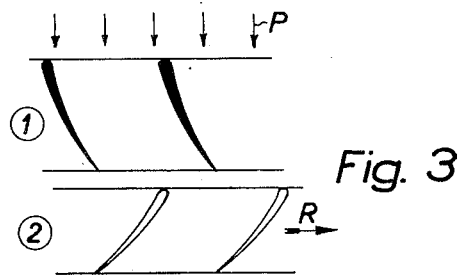
Figure 4:
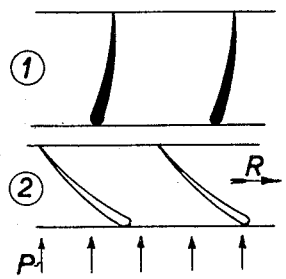
Figure 5:
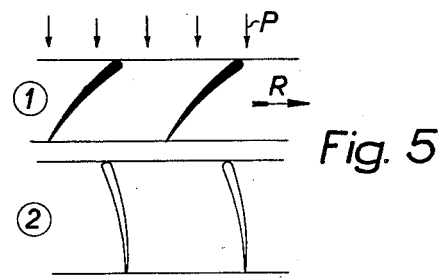

Figures 4 and 5 show the turbine as a pump, the arrow R indicating the direction of rotation.

Figure 6:
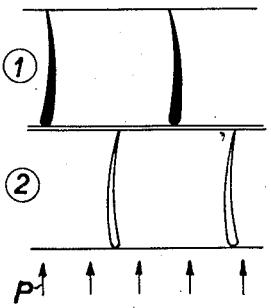
Figure 7:
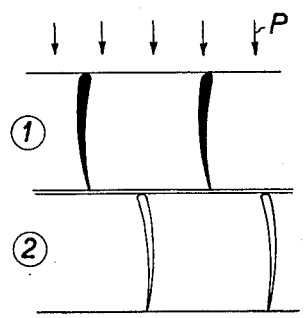

Figures 6 and 7 show the blade position for the case where the turbine is operated as a passage or no-load path, in which case, according to requirements, both wheels may be freely movable, or one may be freely movable and the other fast, or both may be fast.

The invention renders it possible for the turbine and the electrical or mechanical machine to be united as a self-contained unit, it being possible for the connection to take various forms. Thus, for example, the magnet windings of the electrical machine may be connected to one turbine rotor and the armature windings to the other turbine rotor. In the construction according to Figure 9, the armature 6" of a synchronous generator is connected with the outer rim 7' of the rotor 2 by way of a suitable supporting construction, so that the armature rotates with the rim 7' of the rotor 2 (Figure 1), when this wheel is acting as rotor.

The stator 6''' of the electrical machine is directly connected, by means of a supporting flange 13, to the rim 7 of the other rotor 1 and rotates with the latter when the wheel 1 is used as rotor.

The connection of the turbine with the electrical machine can also be so achieved that the stator 6'' (Figure 10) of the electrical machine is secured to the fixed housing 6' (Figures 1 and 10), while the rotor is alternatively connected with one or other of the rotor rims by a special coupling device.

A device of this type is shown in the embodiment according to Figures 10 and 11.

The coupling is effected by a plurality of eccentric rollers 14, 14' distributed uniformly over the inside of the electric rotor rim 16, which rollers can be adjusted by means of levers 15, 15' provided thereon and mount the electric rotor exactly concentrically on the outer rim 7 or 7' of the rotor at the time. The connection is such that it becomes constantly more firm as power is delivered. As soon as the electrical rotor rim 16 is coupled fast with one of the two rotor rims 7 or 7', the other rotor can be released and secured.

In the example shown in Figures 10 and 11, the rollers 14 are located in the binding position and connect the outer rim 7' of the rotor 2 with the electrical rotor rim 16.

Another example of the arrangement of the electrical machine and the machine unit comprising the two rotors is shown in Figure 12.

The hub members 17 and 17' in this constructional example are enlarged to such an extent that generators of normal construction without gearing can be arranged therein. In the middle section of the water supply tube 19, which is secured between the two wallings 8, 8', two cylindrical slide valves 18, 18' are displaceable as closure members towards the hub members 17, 17', said valves shutting off the annular space surrounding the hub members. For rendering inoperative, one of the shut-off members has to be actuated. If both slide valves are closed, the space in the water supply pipe 19 can be emptied.

The two rotors 1 and 2 are so arranged between the two supporting blade rings 4, 4', similarly to the arrangement according to Figure 1, that always one takes over the function of a guide wheel after being fixed.

With large and extremely large machine units, one side can be constructed as a machine chamber which can be patrolled or inspected, said chamber being accessible through one of the hollow supporting blades.

The enlargement of the two turbine hubs has the further advantage that the rotors of the machine are protected, since the hubs serve at the same time as breakwaters. This is of particular importance for the use of the machine assembly in tidal power installations, which are subject to strong tidal currents.

A combination of the hydraulic machine with the electrical or mechanical machine can be effected, according to Figure 13, in such manner that the forces on the two rotors 1 and 2 are transmitted by means of a hollow shaft 20 connected with the rotor 1 and a through shaft 21 connected fast with the other rotor 2 to the corresponding parts of the electrical machine, so that always one rotates with the turbine part operative as a rotor.

In the connection of the hydraulic machine with the electrical machine as shown in Figure 14, always one of the two rotors is coupled with the shaft 22 by a clutch disc 23 which is displaceable on a shaft 22 common to both rotors 1 and 2. The shaft is connected with the rotors of the electrical machines arranged in the enlarged hubs 17, 17'.

The constructional example according to Figure 15 shows that all parts necessary for the operation of the electrical machine can be arranged in a turbine hub which is enlarged only on one side of the installation.

Similar to the arrangement shown in Figure 12, the enlarged hub 17 is supported in the brickwork 8, while the hub 24 following the rotor 2 is supported by means of the supporting blades 26 in the water supply pipe 27, which in this case consists of cast steel. As closure members, a cylindrical slide valve 18 is used on the side of the enlarged hub 17 and a throttle valve 11 on the opposite side.

The connection of the hydraulic machine with the electrical machine can be effected in a manner similar to Figures 13 and 14.

The arrangement of the two rotors according to the present invention is, however, not limited only to the direct combination of turbine, pump and electrical machine, but can be used independently of one another also in machine assemblies built up in a different manner.

Such a use can be found by the arrangement, for example, in a machine assembly in which the electrical or mechanical part is separated from the hydraulic part by the fact that the power delivery or power transmission is effected by the extended shaft, the electrical machine or the mechanical machine being arranged in a separate chamber externally of the supply pipe for the driving water.

An example of this nature is shown in Figure 16, in which a machine set having an axial approach flow and capable of being used as a pump or turbine, said set comprising two rotors 1 and 2, is mounted in the boss 28. The turbine is held with the water supply pipe 29 surrounding it in the brickwork 8, 8' by means of the flanges 30.

The electrical or mechanical machine is located externally of the water supply pipe and can be driven by the extended outwardly leading shaft 31.

The coupling necessary for the two-way driving of the shaft is disposed inside the turbine boss and can be of any desired form, for example, according to Figure 13 or Figure 14.

A further embodiment of the coupling of the electrical machine with the turbine is shown in Figure 17. The coupling is suitable for the machine aggregate in the constructional example according to Figure 1.

A rotor rim 32 of an electrical machine disposed over the rotor rims 7, 7' of the turbine is provided with laterally arranged teeth 33, 33', which face similar teeth 34, 34' of the turbine rotor rims 7, 7'. By means of a laterally displaceable coupling element 35, the oppositely disposed teeth can be coupled with one another at any time. The coupling elements are uniformly distributed on the periphery of a ring 36, so that by displacing the ring, the wheel actually in operation as a rotor is connected with the rotor of the electrical machine.

Figure 18 shows one construction of the clutch for a machine aggregate of the type according to Figure 12.

The rotor 36 of the electrical machine is mounted on a through shaft 37, as is also the rotor 2 of the turbine. The second rotor 1 is mounted by means of a hollow shaft 38 on a hollow shaft 39 of the first rotor 2.

Provided at the ends of the two hollow shafts 38 and 39 are sets of teeth 38' and 39', into which can enter a displaceable coupling ring 40 with dogs 40' into one of the sets of teeth 38' and 39'. The coupling ring 40 is also in permanent connection with the electrical rotor 36, which has teeth 36'.

By lateral displacement of the coupling ring 40, the wheel serving at any time as rotor can be coupled with the electrical rotor.

Figures 19 and 20 show an example of the step-by-step adjustment of the blades by the servo-motor with one step per piston stroke. Figure 19 is an axial section through the boss in the region of one rotor of a turbine constructed in accordance with the invention. 41 is the rotating boss portion, which rotates about the axis 42. 43 represents a section of a blade with the blade root 44. The adjustment of the blades is effected step-by-step by the piston 45 of the annularly constructed servo-motor with the pressure chambers 46. The movement of the servo-motor piston 45 is transmitted by means of the sliding member 48 travelling in the guide 47 and by means of the pin 49 to the driver device 50. The latter is consequently rotated to the left and right by the reciprocating movement of the piston 45. The driver device 50 can be coupled with the blade root 44 by the coupling pins 51, which are moved by the piston 52 controlled by oil under pressure, the pins 51 being pushed outwardly. The control of the pins 51 will be effected in this case in such manner that the power connection between the servo-motor piston 45 and the blades 43, according to the intended direction of adjustment of the blades, is only produced with the forward and rearward travel of the piston 45. During the idle travel of the piston 45, the blade root 44 is locked in relation to the boss portion 41 by the pin 53, as shown in Figure 11, so that unintended adjusting movements of the blades 43 is not possible. The pin 53 is shifted at the instant at which the piston 45 reaches the end position of the driving stroke, under the influence of the spring 54 in bores of the blade root 44, whereby the blocking action takes effect. At the commencement of the next driving stroke of the piston 45, the pin 51 with its projection 55 forces back the pin 53, so that the locking of the blade is cancelled out again for the driving stroke.

The arrangement which is illustrated is obviously also capable of being used with single-wheel turbines, in which the adjustment of the blades is to be carried out.

Figures 21 and 22 show an example of the step-by-step adjustment of the blades by the servo-motor of the turbine with two steps per piston stroke. Figure 21 represents a radial section through the boss of a turbine constructed in accordance with the invention, while Figure 22 is a plan view of Figure 21. 56 are sections of rotor blades with the blade roots 57. These are provided with toothed rings 58. The racks 60 are arranged on the ring 59 moved by the servo-motor piston (not shown). By turning the ring 59 about the axis 61 of the turbine, the racks 60 can be brought into engagement with the toothed rim of one blade root or of the other adjacent blade root. By this means, the adjustment of the blades in the same direction of movement is effected during the reciprocating movement of the servo-motor piston. If the arrangement in this case is such that, with the turning of the ring 59, the teeth of the connection being broken remain in engagement, even if only loosely, until the teeth of the connection being made are in engagement, even if only loosely, this prevents the blades being moved unintentionally during the adjusting operation.

Figure 23 shows an example of the disc-shaped construction of the blade roots. 62 is the section of a blade with the cylindrical root core 63. Fitted over the latter is the annular disc 64 and the core and annular disc are fixed axially relatively to one another by the divided locking ring 65 and the covering ring 66. The packing 67 and the pressure ring 68 thereof can be fitted on to the core 63, which is particularly favourable for the quality of the packing.

Figure 24 illustrates the arrangement of slipping clutches or slipping brakes with a double-wheel turbine. The figure is an axial section through the boss of a double-wheel turbine constructed in accordance with the invention. 69 are sections of the blades of the two blade wheels. The blades are mounted with the disc-shaped root plates 70 in the rotating boss portions 71 and 72. The rotating parts are held by the fixed hub parts 73 and 74. Leading to the electrical or mechanical machine with which the rotors cooperate is the shaft 75 on which is fitted the clutch 76. By means of the latter, the power connection between one or other of the rotors can be produced by the shaft 75. The clutch 76 is constructed as a slipping clutch with the friction discs 77. These are urged against the rotating boss portions 71 or 72 by the piston 78 which is controlled by oil under pressure and thus effect a gentle adaptation of the speeds of rotation to the parts actually being coupled. The fixed coupling is then effected by inserting the pin 79 controlled by oil under pressure. In a similar manner, the blade wheel actually arranged as a guide wheel is gently braked in relation to the fixed boss portion by a slipping brake, with the aid of the oil-operated friction discs 80. The securing of the corresponding guide wheel is then effected by the pins 81.

I claim:

1. A turbine arrangement comprising, in combination, a guide means for guiding a fluid selectively in opposite directions along a predetermined path; a pair of turbine wheels arranged in said predetermined path in such manner that the fluid consecutively flows through said turbine wheels in a sequence depending on the direction of flow of the fluid; supporting means supporting said turbine wheels for rotation independently of each other; and locking means for selectively locking any one of said turbine wheels in accordance with the direction of flow of the fluid so that the locked turbine wheel serves as a guide wheel for guiding the fluid.

2. A turbine arrangement comprising, in combination, a tubular guide means for guiding a fluid selectively in opposite directions along a predetermined path; a pair of turbine wheels arranged in said predetermined path in said tubular guide means in such manner that the fluid consecutively flows through said turbine wheels in a sequence depending on the direction of flow of the fluid; supporting means supporting said turbine wheels for rotation independently of each other; and locking means for selectively locking any one of said turbine wheels in accordance with the direction of flow of the fluid so that the locked turbine wheel serves as a guide wheel for guiding the fluid.

3. A turbine arrangement comprising, in combination, a guide means for guiding a fluid selectively in opposite directions along a predetermined path; a pair of coaxial turbine wheels arranged in said predetermined path in such manner that the fluid consecutively flows in axial direction through said turbine wheels in a sequence depending on the direction of flow of the fluid; supporting means supporting said turbine wheels for rotation independently of each other; and locking means for selectively locking any one of said turbine wheels in accordance with the direction of flow of the fluid so that the locked turbine wheel serves as a guide wheel for guiding the fluid.

4. A turbine arrangement comprising, in combination, a tubular guide means for guiding a fluid selectively in opposite directions along a predetermined path; a pair of coaxial turbine wheels arranged in said predetermined path in said tubular guide means in such manner that the fluid consecutively flows in axial direction through said turbine wheels in a sequence depending on the direction of flow of fluid; supporting means supporting said turbine wheels for rotation independently of each other; and locking means for selectively locking any one of said turbine wheels in accordance with the direction of flow of the fluid so that the locked turbine wheel serves as a guide wheel for guiding the fluid.

5. A turbine arrangement comprising, in combination, a guide means for guiding a fluid selectively in opposite directions along a predetermined path; a pair of coaxial turbine wheels arranged in said predetermined path in such manner that the fluid consecutively flows in axial direction through said turbine wheels in a sequence depending on the direction of flow of the fluid; supporting means supporting said turbine wheels for rotation independently of each other; and locking means for selectively locking the turbine wheel through which the flow of fluid first passes so that the locked turbine wheel serves as a guide wheel for guiding the fluid.

6. A turbine arrangement, comprising, in combination, a guide means for guiding a fluid selectively in opposite directions along a predetermined path; a pair of turbine wheels arranged in said predetermined path in such manner that the fluid consecutively flows through said turbine wheels in a sequence depending on the direction of flow of the fluid, each of said turbine wheels including a set of adjustable turbine blades; blade adjusting means for selectively adjusting the position of each of said sets of blades independently of the adjustment of the other of said sets of blades; supporting means supporting said turbine wheels for rotation independently of each other; and locking means for selectively locking any one of said turbine wheels in accordance with the direction of flow of the fluid so that the locked turbine wheel serves as a guide wheel for guiding the fluid after the position of said set of blades of said locked turbine wheel has been adjusted.

7. A turbine arrangement comprising, in combination, a guide means for guiding a fluid selectively in opposite directions along a predetermined path; a pair of coaxial turbine wheels arranged in said predetermined path in such manner that the fluid consecutively flows in axial direction through said turbine wheels in a sequence depending on the direction of flow of the fluid, each of said turbine wheels including a set of turbine blades, each of said turbine blades being turnable about a radially extending axis between a plurality of adjusted positions; blade adjusting means for selectively turning the blades of each set of blades independently of the adjustment of the other of said sets of blades; supporting means supporting said turbine wheels for rotation independently of each other; and locking means for selectively locking any one of said turbine wheels in accordance with the direction of flow of the fluid so that the locked turbine wheel serves as a guide wheel for guiding the fluid after the position of said set of blades of said locked turbine wheel has been adjusted.

8. A turbine arrangement as claimed in claim 7 wherein said supporting means include an elongated supporting member arranged within said tubular guide means substantially coaxial with the same, and a plurality of radially extending blade-like fixed supporting brackets secured to said tubular guide means and to said supporting member for supporting the latter.

9. A turbine arrangement as claimed in claim 7 wherein each of said turbine blades includes a root portion, and wherein each of said turbine wheels includes a hub portion formed with bearing recesses receiving said root portions of said blades so as to turnably support said turbine blades.

10. A turbine arrangement as claimed in claim 9 and including an annular member surrounding each of said root portions and being secured thereto.

11. A turbine arrangement as claimed in claim 9 wherein said blade adjusting means include servo-motor means, and transmission means connecting said servo-motor means with each set of turbine blades.

12. A turbine arrangement as claimed in claim 11 wherein said transmission means include a gear means secured to the root portion of each of said turbine blades;

and a reciprocable rack bar meshing with each gear means and connected to said servo-motor means so as to be operated by the same.

13. A turbine arrangement as claimed in claim 12 wherein each rack bar extends between two gear means of two adjacent root portions of two adjacent turbine blades, and engages during movement in one direction one of said two gear means, and during movement in the opposite direction the other of said two gear means so as to turn one of said two adjacent turbine blades during each reciprocating stroke.

14. A turbine arrangement comprising, in combination, a tubular guide means for guiding a fluid selectively in opposite directions along a predetermined path; a pair of valve means in said tubular guide means spaced from each other in a longitudinal flow direction of said guide means; a pair of coaxial turbine wheels arranged in said predetermined path in said tubular guide means intermediate said valve means of said pair of valve means in such manner that the fluid consecutively flows in axial direction through said turbine wheels in a sequence depending on the direction of flow of the fluid, each of said turbine wheels including a set of turbine blades, each of said turbine blades being turnable about a radially extending axis between a plurality of adjusted positions; blade adjusting means for selectively turning the blades of each set of blades independently of the adjustment of the other of said sets of blades; supporting means supporting said turbine wheels for rotation independently of each other; and locking means for selectively locking any one of said turbine wheels in accordance with the direction of flow of the fluid so that the locked turbine wheel serves as a guide wheel for guiding the fluid after the position of said set of blades of said locked turbine wheel has been adjusted.

15. A turbine arrangement comprising, in combination, a guide means for guiding a fluid selectively in opposite directions along a predetermined path; a pair of turbine wheels arranged in said predetermined path in such manner that the fluid consecutively flows through said turbine wheels in a sequence depending on the direction of flow of the fluid; supporting means supporting said turbine wheels for rotation independently of each other; locking means for selectively locking the turbine wheel through which the flow of fluid first passes so that the locked turbine wheel serves as a guide wheel for guiding the fluid to the other turbine wheel; electric generator means including a rotor; and coupling means for selectively connecting said rotor with any one of said turbine wheels for connecting said rotor for rotation with said other of said turbine wheels when one of said turbine wheels is locked.

16. A turbine arrangement comprising, in combination, a tubular guide means for guiding a fluid selectively in opposite directions; a pair of coaxial turbine wheels arranged within said tubular guide means in such manner that fluid consecutively flows in axial direction through said turbine wheels in a sequence depending on the direction of the fluid flow, each of said turbine wheels including a set of adjustable turbine blades; blade adjusting means for selectively adjusting the position of said sets of turbine blades independently of the adjustment of the other of said sets of turbine blades; supporting means secured to and located in said tubular guide means and supporting said turbine wheels for rotation independently of each other; locking means for selectively locking the turbine wheel through which the fluid flow first passes so that the locked turbine wheel serves as a guide wheel for guiding the fluid after the position of said set of blades of said locked turbine wheel has been adjusted; electric generator means including a rotor; and coupling means for selectively connecting said rotor with any one of said turbine wheels so as to connect said rotor for rotation with the other of said turbine wheels when one of said turbine wheels is locked.

17. An arrangement as claimed in claim 16 wherein said coupling means include friction means for gradually coupling said rotor with said other turbine wheel.

18. An arrangement as claimed in claim 16 wherein said electric generator means is arranged outside of said tubular guide means; and including a shaft means connected for rotation to said rotor, and wherein said coupling means selectively connect said shaft means with any one of said turbine wheels.

19. A turbine arrangement comprising, in combination, a guide means for guiding a fluid selectively in opposite directions along a predetermined path; a pair of turbine wheels arranged in said predetermined path in such manner that the fluid consecutively flows through said turbine wheels in a sequence depending on the direction of flow of the fluid; supporting means supporting said turbine wheels for rotation independently of each other; locking means for selectively locking the turbine wheel through which the flow of fluid first passes so that the locked turbine wheel serves as a guide wheel for guiding the fluid to the other turbine wheel; electric generator means including an annular rotor surrounding said turbine wheels; and coupling means for selectively connecting said rotor with any one of said turbine wheels for connecting said rotor for rotation with said other of said turbine wheels when one of said turbine wheels is locked.

20. A turbine arrangement comprising, in combination, a tubular guide means for guiding a fluid selectively in opposite directions; a pair of coaxial turbine wheels arranged within said tubular guide means in such manner that fluid consecutively flows in axial direction through said turbine wheels in a sequence depending on the direction of the fluid flow, each of said turbine wheels including a set of adjustable radially extending turbine blades, a hub portion adjustably supporting said turbine blades, and an outer rim portion connecting the outer ends of said radially extending turbine blades; blade adjusting means for selectively adjusting the position of said sets of turbine blades independently of the adjustment of the other of said sets of turbine blades; supporting means secured to and located in said tubular guide means and supporting said turbine wheels for rotation independently of each other; locking means for selectively locking the turbine wheel through which the fluid flow first passes so that the locked turbine wheel serves as a guide wheel for guiding the fluid after the position of said set of blades of said locked turbine wheel has been adjusted; electric generator means including an annular rotor surrounding said rim portions of said turbine wheels; and coupling means for selectively connecting said rotor with any one of said turbine wheels so as to connect said rotor for rotation with the other of said turbine wheels when one of said turbine wheels is locked.

21. A turbine arrangement comprising, in combination, a tubular guide means for guiding a fluid selectively in opposite directions; a pair of coaxial turbine wheels arranged within said tubular guide means in such manner that fluid consecutively flows in axial direction through said turbine wheels in a sequence depending on the direction of the fluid flow, each of said turbine wheels including a set of adjustable radially extending turbine blades, a hub portion adjustably supporting said turbine blades, and an outer rim portion connecting the outer ends of said radially extending turbine blades; blade adjusting means for selectively adjusting the position of said sets of turbine blades independently of the adjustment of the other of said sets of turbine blades; supporting means secured to and located in said tubular guide means and supporting said turbine wheels for rotation independently of each other, locking means for selectively locking the turbine wheel through which the fluid flow first passes so that the locked turbine wheel serves as a guide wheel for guiding the fluid after the position of said set of blades of said locked turbine wheel has been adjusted; electric generator means including an annular rotor surrounding said rim portions of said turbine wheels; a pair of outer gear rings, each gear ring secured to the rim portion of one of said turbine wheels; an annular coupling member secured to said annular rotor and having two inner gear rings associated with said outer gear rings of said turbine wheels; and a coupling member shiftable between a first position connecting one of said outer gear rings to one of said inner gear rings, and a second position connecting the other of said outer gear rings to the other of said inner gear rings for selectively connecting said annular coupling member and said rotor with any one of said turbine wheels so as to connect said rotor for rotation with the other of said turbine wheels when one of said turbine wheels is locked.

22. An arrangement as claimed in claim 21 wherein said locking means are manually operated locking means for locking any one of said turbine wheels to said supporting means.

23. An arrangement as claimed in claim 22 wherein said manually operated locking means include axially shiftable locking pins.

24. A turbine arrangement comprising, in combination, a guide means for guiding a fluid selectively in opposite directions along a predetermined path; a pair of turbine wheels arranged in said predetermined path in such manner that the fluid consecutively flows through said turbine wheels in a sequence depending on the direction of flow of the fluid; supporting means supporting said turbine wheels for rotation independently of each other; locking means for selectively locking the turbine wheel through which the flow of fluid first passes so that the locked turbine wheel serves as a guide wheel for guiding the fluid to the other turbine wheel; electric generator means including a rotor; friction brake means for selectively braking any one of said turbine wheels before locking by said locking means; and friction coupling means for selectively connecting said rotor with any one of said turbine wheels for connecting said rotor for rotation with said other of said turbine wheels when one of said turbine wheels is locked.

25. A turbine arrangement comprising, in combination, a tubular guide means for guiding a fluid selectively in opposite directions along a predetermined path; a pair of turbine wheels arranged in said predetermined path in said tubular guide means in such manner that the fluid consecutively flows through said turbine wheels in a sequence depending on the direction of flow of the fluid; supporting means including at least one hollow supporting member adapted to house auxiliary apparatus and adapted to be entered by an operator, said supporting means supporting said turbine wheels for rotation independently of each other; and locking means for selectively locking any one of said turbine wheels in accordance with the direction of flow of the fluid so that the locked turbine wheel serves as a guide wheel for guiding the fluid.

26. An arrangement as claimed in claim 25 and comprising an electric generator including a rotor and being housed in said hollow supporting member; a shaft means connected for rotation to said rotor and extending through said hollow supporting member; and coupling means for selectively connecting each of said turbine wheels to said shaft means.

27. A turbine arrangement comprising, in combination, a guide means for guiding a fluid selectively in opposite directions along a predetermined path; a pair of turbine wheels arranged in said predetermined path in such manner that the fluid consecutively flows through said turbine wheels in a sequence depending on the direction of flow of the fluid, each of said turbine wheels including a set of adjustable turbine blades; blade adjusting means for selectively adjusting the position of each of said sets of blades independently of the adjustment of the other of said sets of blades; supporting means supporting said turbine wheels for rotation independently of each other; locking means for selectively locking any one of said turbine wheels in accordance with the direction of flow of the fluid so that the locked turbine wheel serves as a guide wheel for guiding the fluid after the position of said set of blades of said locked turbine wheel has been adjusted; and centrifugal governor means connected to said blade adjusting means for adjusting the blade position in accordance with the rotary speed of the other turbine wheel during turbine operation.

28. A turbine arrangement comprising, in combination, a guide means for guiding a fluid selectively in opposite directions along a predetermined path; a pair of turbine wheels arranged in said predetermined path in such manner that the fluid consecutively flows through said turbine wheels in a sequence depending on the direction of flow of the fluid, each of said turbine wheels including a set of adjustable turbine blades; blade adjusting means for selectively adjusting the position of each of said sets of blades independently of the adjustment of the other of said sets of blades; supporting means supporting said turbine wheels for rotation independently of each other; locking means for selectively locking any one of said turbine wheels in accordance with the direction of flow of the fluid so that the locked turbine wheel serves as a guide wheel for guiding the fluid after the position of said set of blades of said locked turbine wheel has been adjusted; and control means arranged in said guide means and adapted to be responsive to differences in the level of the fluid before and behind said turbine wheels, said control means being connected to said blade adjusting means for adjusting the blade position in accordance with the fluid levels.

References Cited in the file of this patent
UNITED STATES PATENTS

| Number | Name | Date |
|---|---|---|
| 812,693 | Smith | Feb. 3, 1906 |
| 892,276 | Lenthwaite | June 30, 1908 |
| 960,747 | Wegner | June 7, 1910 |
| 961,017 | Riggs | June 7, 1910 |
| 994,201 | Robinson | June 6, 1911 |
| 1,448,627 | Huguenin | Mar. 13, 1923 |
| 1,457,170 | Huguenin | May 29, 1923 |
| 1,813,107 | Allner | July 7, 1931 |
| 1,921,905 | Blom | Aug. 8, 1933 |
| 1,978,809 | Moody | Oct. 30, 1934 |
| 2,289,420 | Granger | July 14, 1942 |
| 2,390,068 | Adams et al. | Dec. 4, 1945 |
| 2,518,925 | Nussbaum | Aug. 15, 1950 |
| 2,634,375 | Guimbal | Apr. 7, 1953 |